(No Model.)

R. T. SMITH.
CAN SOLDERING DEVICE.

No. 426,078.   Patented Apr. 22, 1890.

WITNESSES:
L. J. Gwinn
E. R. Rowly

INVENTOR
Robert Tynes Smith
By his Attorney
Wm. L. Bailie

UNITED STATES PATENT OFFICE.

ROBERT TYNES SMITH, OF BALTIMORE, MARYLAND.

CAN-SOLDERING DEVICE.

SPECIFICATION forming part of Letters Patent No. 426,078, dated April 22, 1890.

Application filed January 11, 1890. Serial No. 336,617. (No model.)

*To all whom it may concern:*

Be it known that I, ROBERT TYNES SMITH, a citizen of the United States, residing at Baltimore, in the State of Maryland, have invented certain new and useful Improvements in Can-Soldering Devices; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvement in that class of soldering-machines that are employed in the manufacture of metallic cans and in which the soldering is effected by the direct application of heat to the joint to be soldered without the intervention of a soldering iron or copper; and it consists of a properly-pointed piece of iron or steel, that is operated by suitable mechanism connected with the soldering-machine, whereby it will be caused to enter and traverse the groove or joint to be soldered during the process of soldering, my object being, first, to remove any dirt or rust that may be in the joint, and, finally, so evenly distribute the flux and solder around the seam that a perfect joint will be made, and thereby obviate a large proportion of defective soldering which is usual in this class of work, all of which I accomplish by the devices hereinafter fully described and claimed, reference being had to the accompanying drawings, in which—

Figure 1:
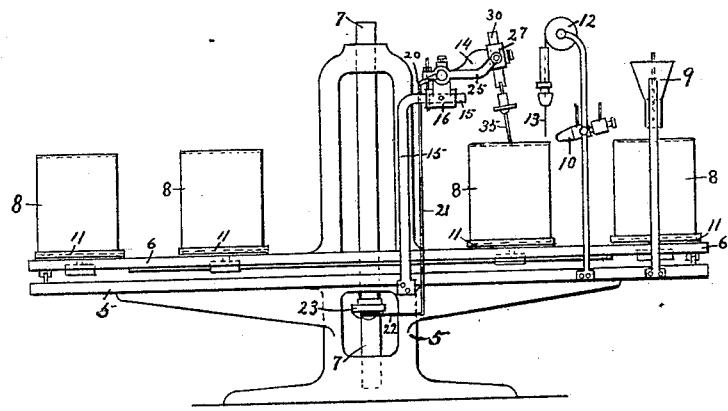
Figure 2:
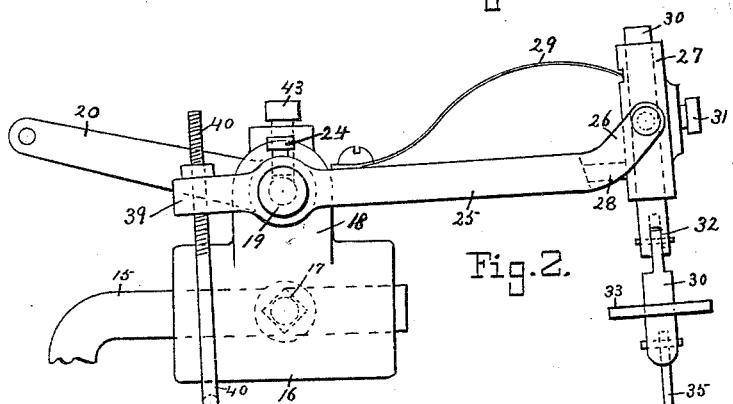
Figures 3, 4:
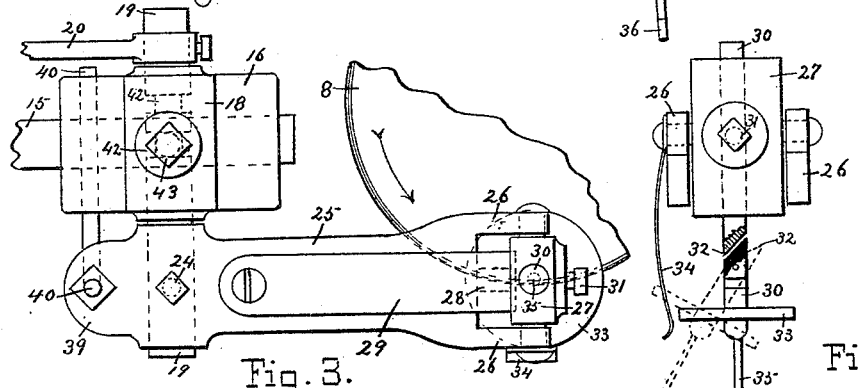

Figure 1 shows an elevation of a can-soldering machine, with the cleansing and distributing device attached thereto. Fig. 2 shows a side elevation in full of the cleansing and distributing device. Fig. 3 shows a view looking down on the device shown in Fig. 2, a part of a can shown thereunder. Fig. 4 shows a detail view of the free end of the distributer, a part of the bar thereof and a part of a can shown in section.

The same numbers refer to the same or similar parts throughout the several views.

In Fig. 1 is represented a soldering-machine by which the heads of a can are soldered to the body thereof, an oxygenated flame being employed to solder the seam without the use of a soldering iron or copper. To this class of machinery, that may be of common form, my invention is particularly adapted, whereby the surfaces to be soldered will be properly cleaned and the flux and solder properly distributed thereover.

For a clear comprehension of the utility of the distributer the following brief description of Fig. 1 will be necessary. 5 denotes a frame, that has mounted thereon the rotating table 6, a spindle 7, which may be driven in any well-known manner, imparting to the said table such intermittent rotating movement that each of the cans 8 thereon will be brought successively under the flux-chamber 9, from which the flux will be automatically dropped on the seam to be soldered, the next movement of the table bringing the can under the gas blow-pipe 10, the flame from which will strike upon the seam to be soldered. In order that a rapid rotating movement may be imparted to the can during the process of soldering, each can is seated upon a disk 11, with which the table is provided, and which is caused to rotate rapidly when brought under the gas blow-pipe 10. At this point of the operation there is fed from the reel 12 the necessary amount of wire solder 13, which will be acted upon by the flame of the gas blow-pipe and melt therefrom just sufficient to solder the can-seam, the rapid rotating movement of the can causing the heat to act upon all parts of the seam and distribute the molten solder thereover, this movement of the can continuing until the solder is sufficiently sweated in the seam, when an automatic movement of the table 6 will bring the next disk 11 and its can under the influence of the gas blow-pipe, and the operation is repeated. The manner of operating just described is that which has hitherto been employed in soldering heads to the body of the can and is attended with the disadvantage that the distribution of the flux and solder is entirely dependent upon the rotating movement of the can. This is not at all a certain means of equally distributing the flux and solder, nor does it provide for any cleansing or sweating of any part of the seam that may be imperfectly tinned or in any way defective. To remedy these defects in the soldering-machine is the object of my invention, which I accomplish by the employment of a distributer 14, which is so placed on the soldering-machine and operated thereby that a thorough cleansing of the seam and a perfect distribution of the flux and solder will be effected during the process of soldering just described.

Referring to Figs. 2, 3, and 4, the following is the description of the construction and operation of the said distributer 14: Attached to some fixed part of the soldering-machine is the supporting-bar 15, the upper end of which is of a bent form and to which is secured the body 16 of the distributer, this body 16 being of a cylindrical form, with an opening therethrough, in which fits and is free to move the end of the said bar 15, thus providing adjustability at this point, and the set-screw 17 serving to secure the body in any position. Extended from the body 16 is the bearing 18, in which is free to turn the shaft 19, a crank 20 being secured to one end of this shaft, to which a downward movement is imparted by the rod 21, one end of which is pivoted to the free end of the crank 20, and its lower end terminating in the bend 22, which engages with a suitable cam 23 on the spindle 7, the rotating movement of which thereby producing a properly-timed vibrating movement to the said crank 20. Secured to the other end of the shaft 19 by means of the set-screw 24 is the arm 25, the jaws 26, Fig. 3, being formed on the free end of this arm, in which is pivoted the head 27, a stop 28 serving to limit in one direction the vibration of the said head, and a spring 29, which bears against the upper part thereof, serving to hold the head against the stop and at the same time permit an outward movement of the lower end of the head. Free to move centrally through the head 27 is the bar 30, which is secured therein at any position by the set-screw 31, a bevel-joint 32 being provided in this bar, which is shown in section in Fig. 4, whereby a movement to one side will be permitted the lower end of this bar, as is shown by the dotted lines in this figure, this joint being provided in case of any irregularity in the position of the can, when this end of the bar will be moved to one side by the outer surface of the can and any damage therefrom avoided, a disk 33 being formed in the lower end of the bar, against which presses the free end of a spring 34, that is secured to the side of the jaw 26, whereby the lower end of the bar 30 is normally held in the vertical position. Secured to the lower end of the bar 30 is the point 35, that is made of steel or other hard metal, the end 36 thereof being of the chisel shape shown in Fig. 4, which is sufficiently sharp to enter well in the joint formed by the body 37 and the head 38 of the can, and thus in the rotating movement of the can thoroughly cleanse the joint and distribute the flux and solder that have been melted by the blow-pipe 10.

In order to guard against any damage which might arise from the breaking of the point 35, there is extended from the arm 25 the projection 39, that has secured thereto the adjustable safety-rod 40, the lower end of which is bent under the body 16, and will thereby limit the downward movement of the arm 25 in case the point 35 should be broken.

The manner of operating is as follows: The cans 8 are placed upon the disks 11 and the rotating movement of the table 6 first brings the cans under the flux-chamber 9, from which will be automatically dropped the flux on the seam to be soldered. The next movement of the table will bring the can in such position that the flame from the gas blow-pipe 10 will strike at some point on the seam to be soldered. At the same time a rapid rotating movement is imparted to the can in the direction indicated by the arrow in Fig. 3, and sufficient wire solder 13 will be fed down from the reel 12 in front of the flame from the gas blow-pipe to be melted thereby, and thus provide sufficient solder to cement the seam. At the same time that the can is brought under the influence of the gas blow-pipe 10, in order to prepare the seam for the solder by cleansing the seam thoroughly and distributing the flux, the rod 21 will at this point be released from the cam 23 by the rotating movement thereof, the arm 25 will drop by gravity, and the chisel-point 36 will fall in the seam to be soldered, in the position shown in Figs. 3 and 4, thus in the rotating movement of the can scraping and cleaning the seam for the proper adherence thereto of the molten flux and solder, and thus so distributing the molten flux and solder that a properly-soldered seam will be produced. When this rotating movement of the can has continued for a certain time, the movement of the spindle 7 will cause the cam 23 to raise the arm 25 in the manner described, another circumferential movement will be imparted to the table 6, and the next can will be subjected to the soldering process.

In order that adjustability may be provided for the distributer 14 for the different-sized cans, the shaft 19 is provided with the grooves 42 thereon, which are shown by dotted lines in Fig. 3, the end of a set-screw 43 fitting in one or the other of these grooves, and thus, while securing the shaft from longitudinal movement, permitting such extension as is required for the can to be operated upon.

Having described my invention and the manner of operating, what I claim, and desire to secure by United States Letters Patent, is—

1. In a can-soldering machine, the combination of a table which is free to be rotated, the disks 11, placed on the said table and free to be rotated thereon, the rotating spindle 7, by which movement is imparted to said table, a wire-solder-feed device 12, a flux-feed device 9, and a distributer 14, consisting of the supporting-bar 15, the body 16, the said body attached to the said bar and free to be moved thereon, the arm 25, pivoted to the said body 16, the head 27, pivoted in one end of said arm 25, the chisel-point 36, attached to the said head 27, and a cam 23, fixed to the said spindle 7, whereby a suitably-timed vibratory movement will be imparted to the arm 25, for the purpose set forth.

2. In a can-soldering machine, the combination of a table which is free to be rotated, the rotating spindle 7, by which movement is imparted to said table, the disks 11, placed on the said table and free to be rotated thereon, a wire-solder-feed device 12, a flux-feed device 9, and a distributer 14, consisting of a body 16, the arm 25, pivoted to the said body, the head 27, pivoted in one end of said arm 25, the bar 30, supported by and free to be moved in the said head 27, the said bar 30 being provided with a beveled joint 32 therein, which will permit its being bent in one direction, the spring 34, for holding the said bar 30 in the vertical position, the chisel-point 36, attached to the said bar 30, and a cam 23, fixed to the said spindle 7, whereby a suitably-timed vibratory movement will be imparted to the arm 25, for the purpose set forth.

3. In a can-soldering machine, the combination of a table which is free to be rotated, the rotating spindle 7, by which movement is imparted to the said table, the disks 11, placed on the said table and free to be rotated thereon, a wire-solder-feed device 12, a flux-feed device 9, and a distributer 14, consisting of the supporting-bar 15, the body 16, attached to the said bar 15 and free to be moved thereon, the arm 25, pivoted to the said body 16, the head 27, pivoted in one end of said arm 25, the chisel-point 36, attached to the said head 27, a cam 23, fixed to the said spindle 7, whereby a suitably-timed vibratory movement will be imparted to the said arm 25, and a safety-rod 40, attached to the said arm 25, whereby its vibratory movement is limited, for the purpose set forth.

In testimony whereof I affix my signature in presence of two witnesses.

ROBERT TYNES SMITH.

Witnesses:
WM. L. BAILIE,
JNO. T. MADDOX.